United States Patent [19]

Thompson et al.

[11] 4,088,535
[45] May 9, 1978

[54] MOBILE NUCLEAR REACTOR CONTAINMENT VESSEL

[75] Inventors: Robert E. Thompson, Bethel Park; Francis R. Spurrier, Pittsburgh; Andrew R. Jones, Murrysville, all of Pa.

[73] Assignee: Westinghouse Electric Corp., Pittsburgh, Pa.

[21] Appl. No.: 767,184

[22] Filed: Feb. 9, 1977

Related U.S. Application Data

[63] Continuation of Ser. No. 592,856, Jul. 2, 1975, abandoned.

[51] Int. Cl.² ............................................. G21C 13/00
[52] U.S. Cl. .......................................... 176/87; 176/38; 176/DIG. 3; 114/16 G
[58] Field of Search ............... 176/38, 87, DIG. 2, 176/DIG. 3; 114/16 R, 16 G

[56] References Cited

U.S. PATENT DOCUMENTS

| 3,016,462 | 1/1962 | Hendricksen et al. | 176/DIG. 2 |
| 3,016,463 | 1/1962 | Needham | 176/DIG. 2 |
| 3,118,818 | 1/1964 | Bray | 176/DIG. 3 |
| 3,164,525 | 1/1965 | Wetch et al. | 176/DIG. 2 |
| 3,208,914 | 9/1965 | Dickson | 176/DIG. 3 |
| 3,290,222 | 12/1966 | Schoessow et al. | 176/DIG. 2 |
| 3,627,633 | 12/1971 | Magladry | 176/DIG. 3 |
| 3,840,431 | 10/1974 | Devin et al. | 176/39 |

FOREIGN PATENT DOCUMENTS

| 2,051,160 | 4/1972 | Germany | 176/39 |
| 868,678 | 2/1959 | United Kingdom | 176/87 |

OTHER PUBLICATIONS

High Speed Nuclear Ships Economic Now, Study Finds; Nucleonics; vol. 21, #6, Jun., 1963; pp. 26 & 27.
U.S. Dept. of Comm.; Nickel & its Alloys; Nat'l Bureau of Stds; Wash. D.C. 20234, May 1968; p. 71.

*Primary Examiner*—Peter A. Nelson
*Attorney, Agent, or Firm*—M. S. Yatsko; Z. L. Dermer

[57] ABSTRACT

A containment vessel for use in mobile nuclear reactor installations. The containment vessel completely surrounds the entire primary system, and is located as close to the reactor primary system components as is possible in order to minimize weight. In addition to being designed to withstand a specified internal pressure, the containment vessel is also designed to maintain integrity as a containment vessel in case of a possible collision accident.

6 Claims, 2 Drawing Figures

MOBILE NUCLEAR REACTOR CONTAINMENT VESSEL

This is a continuation of application Ser. No. 592,856 filed July 2, 1975, and now abandoned.

BACKGROUND OF THE INVENTION

This invention relates generally to nuclear reactors and more particularly to a containment vessel for use in mobile nuclear reactor applications.

The use of nuclear reactors to provide power for mobile applications is not new, as illustrated by nuclear surface ships and nuclear submarines. However, with the recent dramatic increases in fuel oil costs, and the uncertain availability of such oil at any cost, the possibility of utilizing nuclear reactors to provide power for a wide range of applications is being increasingly investigated. Among the various possibilities being investigated is the use of nuclear power for mobile land-based power plants and for marine propulsion of high speed ships such as Surface Effect Ships, hydrofoils, Small Waterplane Area Twin Hull Ships, Air Cushion Vehicles, and other similar ships. These ships are characterized by the requirement of high power, for their high speed, and correspondingly high fuel consumption. Additionally, in order to store this fuel for long range operations, the vehicle size must be drastically increased, causing corresponding increases in vehicle costs. The development of lightweight nuclear propulsion power plants offers a way to achieve low fuel costs at high power operating over long ranges in relatively small vehicles, thereby making nuclear propulsion attractive for this type of application.

In the adaption of nuclear power for these ships, serious potential problems have been cited, among them being the confinement of the reactor system. In the design criteria for nuclear reactors are hypotetical accidents which the reactor must be able to withstand. One of these accidents for marine reactor applications is the possibility of a collision with another ship. In contrast to prior naval applications, the high speed ships are of a lightweight structure. As such, the high speed ships will afford scant protection for the nuclear reactor in the event of a bow-on collision. The prior art practice of installing shock-absorbing plates externally of the containment to cushion the shock is inapplicable to these lightweight ships; the postulated accident for these lightweight ships is that the colliding ship will cut through the high speed ship in which the reactor is installed. This type of collision would breach the containment of the prior art, resulting in an increased potential for inadvertent release of radioactive material to the environment, which must not be allowed to occur.

SUMMARY OF THE INVENTION

The aforementioned problem in the prior art is eliminated by this invention by utilizing a containment vessel able to withstand the impact of a collision without the release of radioactive materials to the environment. The containment vessel comprises two cylinders joined in the form of an inverted "T". The vertical cylinder immediately surrounds the reactor assembly, while the horizontal cylinder contains the turbomachinery, emergency cooling system, and power conversion equipment, among other components. The entire reactor primary system is contained within the containment vessel. To minimize weight, the containment vessel is located as close as possible to the reactor components. The containment vessel is of a thickness such that the impact of a collision, while possibly deforming it, will not open it to the environment.

BRIEF DESCRIPTION OF THE DRAWINGS

Reference is now made to the description of the preferred embodiment, taken in connection with the accompanying drawings, in which.

DESCRIPTION OF THE PREFERRED EMBODIMENT

Figure 1:
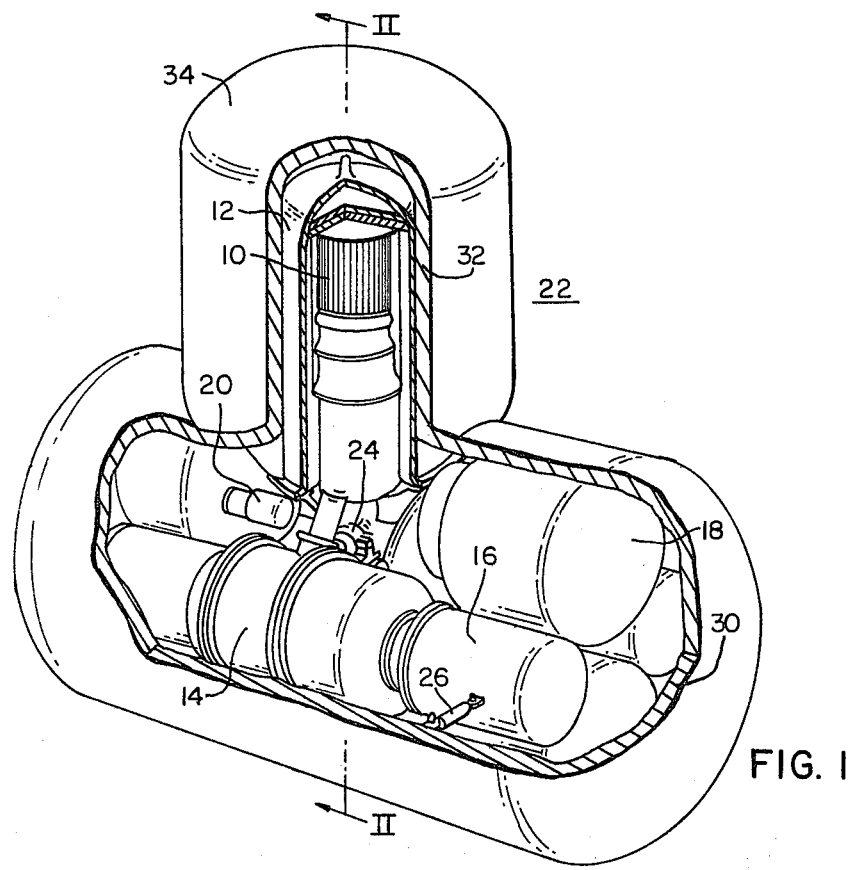
FIG. 1 is an isometric view of a reactor system utilizing the containment vessel of this invention.

Throughout the description which follows, like reference characters indicate like elements of the verious figures of the drawing.

FIG. 1 illustrates a compact nuclear reactor system for use in mobile applications. Although a gas-cooled nuclear reactor is shown, one skilled in the art would appreciate that other types of reactors may be utilized. Also, the invention is applicable to mobile land-based nuclear power plants, although the preferred embodiment illustrated is for shipboard nuclear power plants.

A nuclear core 10, comprised of fissile material, is situated within a nuclear reactor pressure vessel 12. Situated vertically beneath, and extending horizontally outwardly, is the turbomachinery necessary to transform the heat generated in the nuclear core 10 into useful power or electricity. Typical of the components necessary for this transformation include a turbine-compressor heat exchanger 14, a generator 16, and a supply of coolant 18. Also situated beneath the pressure vessel 12 is an emergency cooling system 20. The pressure vessel 12 is secured to the containment vessel 22 by a main support 24. The main support 24 additionally secures some of the primary system components 14, 16, 18, to the containment vessel 22. These primary system components, 14, 16, 18, are also secured to the containment vessel 22 by support links 26.

The preferred containment vessel 22 is comprised of two cylinders 30 and 32, the cylindrical design being chosen for minimum weight. The horizontal cylinder 30 completely encloses the primary system components 14, 16, 18, and supports them in their location. The vertical cylinder 32 is hermetically secured to the horizontal cylinder 30, forming a generally inverted "T". The vertical cylinder 32 completely surrounds the nuclear reactor pressure vessel 12. Externally of the vertical cylinder 32 is the primary shield 34 for preventing the escape of radioactivity from the nuclear core 10. This primary shield 34 can be of materials such as metallic hydride for minimum specific weight, or water for minimum cost. The placement of the reactor primary shielding 34 outside of the containment vessel 22 provides freedom of selection for the shielding material as well as a weight advantage. Additionally, the shield cooling system (not shown) is simplified in that interactions with the primary working fluid is precluded. Although not shown in the drawings, a similar shield may encircle the horizontal cylinder 30 to prevent the escape of radioactivity for the primary system components 14, 16, 18. Alternatively, the horizontal cylinder 30 may be sized to prevent the escape of radioactivity.

Figure 2:
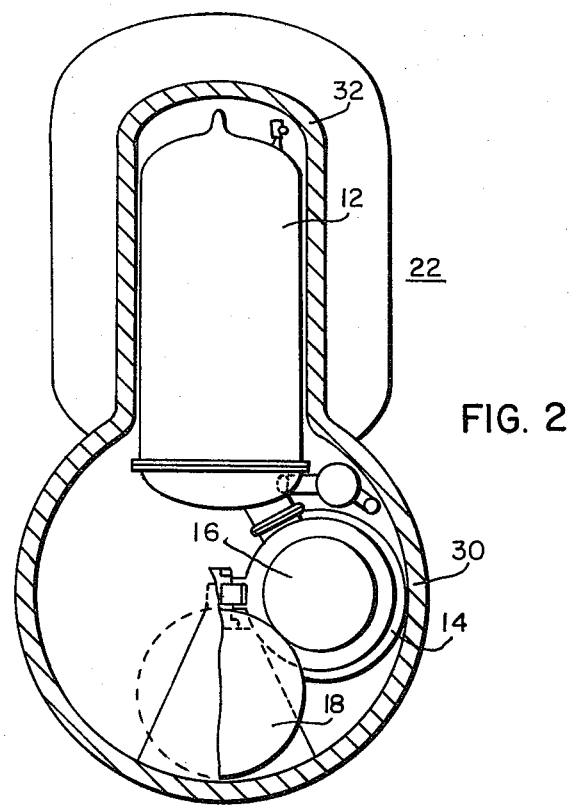
FIG. 2 is a view taken along line II—II of FIG. 1.

Referring now more particularly to FIG. 2, the location of the containment vessel 22 and relationship to the primary reactor system is shown. The vertical cylinder 32 is located as close as possible to the nuclear reactor pressure vessel 12. The horizontal cylinder 30 is also located as close as possible to the system components 18, 14, 16 as possible. Generally, the distance between the containment vessel 22, namely the horizontal cylinder 30 and the vertical cylinder 32, and the components which they encapsulate is on the order of four inches (10.16 cm.). The containment vessel 22 is located in such close proximity to the components in order to minimize the weight of the containment vessel 22.

The cylinders 30 and 32 are of a high impactresistant material, and should be of a thickness necessary to withstand the impact of a bow-on ship collision. The criteria for the selection of the material and the thickness necessary for the nuclear system shown depends upon numerous internal and external factors, among which are:

1. The containment vessel 22 must be able to withstand an internal pressure of approximately 750 pounds per square inch absolute (5.171 MPA). This maximum pressure results from a break in the coolant flow system, and is generally incorporated in the design of prior art containment vessels.

2. The containment vessel 22 must be able to withstand a bow-on-side impact by a 30 knot (15.43 M/S) displacement ship. This is the worst collisional accident postulated.

3. The containment vessel 22 must be able to withstand sinking to a depth equal to the continental shelf (approximately 1200 feet or 365 meters) without collapse. This requirement is based on an accident involving the ship sinking either while in a port or closely off-shore, thereby endangering the general population.

4. The material must be compatible with marine surface and subsurface environments to which the containment vessel 22 may be exposed.

The aforementioned criteria are for illustrative purposes, and are for the installation of the reactor system in a Surface Effect Ship. The basic criteria, namely the need to design for maximum internal pressure, ship collisional impact, and water pressure from sinking, are applicable for other installations, although the specific internal pressure, ship speed, and depth may vary.

Based upon the above criteria, numerous materials and thicknesses can be utilized in the design of the containment vessel 22. As an example, to meet the aforementioned criteria, a two inch (5.08 cm) thickness of an alloy containing at least 50% nickel, such as that sold commercially under the trade name "Inconel 718" is suitable for this application. Another material which may be used is carbon steel.

As an example as to the relative size of the containment vessel 22, for a 140,000 horsepower reactor, the containment vessel 22 shown would be approximately thirty-two feet long, eighteen feet wide, and thirty-four feet high.

With the disclosed arrangement, penetrations through the containment vessel 22 are electrical, helium (the reactor coolant), lubrication, and cooling fluid (for the generator). The waste heat is removed by a water line penetration. To prevent the escape of radioactivity in the event of an accident, the penetrations desirably provide means for sealing the containment vessel 22 in the event of such an accident. For example, explosively deformed seals may be utilized for sealing the penetrations in the event of an accident.

Refueling and major maintenance operations will generally not occur while the reactor system is located in its mobile installation. Instead, the entire containment vessel 22 would be removed from its installation, and transferred to a stationary facility, where the containment vessel 22 would be opened by means such as cutting or unbolting. Minor maintenance operations may be provided for on the containment vessel 22 by utilizing, for example, welded or bolted ports (not shown) adjacent to the reactor component it is desired to provide service for. The parts would also be designed to withstand the same external forces that the containment vessel 22 is designed to withstand.

Therefore, it can be seen that this invention provides a means for utilizing mobile nuclear power plants while preventing the release of radioactivity from the nuclear reactor primary system in the event of a collision by designing the containment vessel to withstand not only internal forces, but also external forces which may be imposed on the containment vessel.

We claim as our invention:

1. A containment vessel for use with mobile nuclear reactor systems, said containment vessel enclosing the nuclear reactor primary system, said containment vessel being disposed within a lightweight, high speed ship, said containment vessel comprising:

a horizontal cylinder; and a vertical cylinder hermetically secured to said horizontal cylinder intermediate the ends of said horizontal cylinder, said vertical cylinder extending vertically upward from said horizontal cylinder, said vertical cylinder and said horizontal cylinder forming a generally inverted T, said containment vessel being made of a material having a thickness such as to withstand external forces imposed on said containment vessel of a magnitude substantially equal to the forces exerted by water at a depth of twelve hundred feet below sea level.

2. The containment vessel according to claim 1 wherein said external forces are of a magnitude substantially equal to the forces exerted by water at a depth of twelve hundred feet below sea level.

3. The containment vessel according to claim 1 wherein said containment vessel is constructed of an alloy containing at least 50% nickel with a thickness of at least two inches.

4. The containment vessel according to claim 1 wherein said nuclear reactor primary system comprises a plurality of components including a heat exchanger, a generator, and a supply of coolant, said containment vessel being located proximate said components.

5. The containment vessel according to claim 4 wherein said containment vessel supports said components.

6. The containment vessel according to claim 4 wherein one of said components is a nuclear reactor pressure vessel, and said vertical cylinder encloses said pressure vessel.

* * * * *